(12) United States Patent
Eminovic et al.

(10) Patent No.: US 9,353,777 B2
(45) Date of Patent: May 31, 2016

(54) METHOD AND APPARATUS TO ATTACH DEVICE TO DIN RAIL

(71) Applicant: Rockwell Automation Technolgies, Inc., Mayfield Heights, OH (US)

(72) Inventors: Sal Eminovic, Milwaukee, WI (US); Jeffrey Annis, Waukesha, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 13/937,940

(22) Filed: Jul. 9, 2013

(65) Prior Publication Data

US 2015/0016875 A1 Jan. 15, 2015

(51) Int. Cl.
*B25G 3/18* (2006.01)
*F16B 21/00* (2006.01)
*F16D 1/00* (2006.01)
*F16B 2/10* (2006.01)
*H02B 1/052* (2006.01)

(52) U.S. Cl.
CPC *F16B 2/10* (2013.01); *H02B 1/052* (2013.01); *H02B 1/0526* (2013.01); *Y10T 403/595* (2015.01)

(58) Field of Classification Search
CPC ....... Y10T 403/595; F16B 2/10; H02B 1/052; H02B 1/0526
USPC .............. 403/321, 322.4, 325–327, 330, 331, 403/345; 248/214, 220.22, 222.122, 689; 439/716
See application file for complete search history.

(56) References Cited

U.S. PATENT DOCUMENTS

| 3,123,425 | A | * | 3/1964 | Blanchet | 439/716 |
| 4,067,529 | A | * | 1/1978 | Milcoy | 248/222.12 |
| 4,234,239 | A | * | 11/1980 | Wilmes et al. | 439/94 |
| 5,602,363 | A | * | 2/1997 | Von Arx | 174/559 |
| 5,842,889 | A | * | 12/1998 | Kollmann | 439/716 |
| 5,904,592 | A | * | 5/1999 | Baran et al. | 439/532 |
| 5,907,476 | A | * | 5/1999 | Davidsz | 361/732 |
| 6,017,251 | A | * | 1/2000 | Rittmann | 439/716 |
| 6,431,247 | B1 | * | 8/2002 | Harrison et al. | 160/168.1 R |
| 6,543,957 | B1 | * | 4/2003 | Raspotnig | 403/286 |
| 6,916,214 | B2 | * | 7/2005 | Conrad | 439/716 |
| 7,524,214 | B2 | * | 4/2009 | Johnson et al. | 439/701 |
| 7,758,368 | B2 | * | 7/2010 | Schelonka et al. | 439/325 |
| 8,062,061 | B2 | | 11/2011 | Lim et al. | |
| 8,066,239 | B2 | * | 11/2011 | Molnar et al. | 248/214 |
| 8,341,810 | B2 | * | 1/2013 | Rayos | 24/462 |
| 2008/0026631 | A1 | | 1/2008 | Kapinos et al. | |
| 2008/0108248 | A1 | | 5/2008 | Lim et al. | |

FOREIGN PATENT DOCUMENTS

DE 202004019381 U1 2/2005
EP 0909122 A2 4/1999

* cited by examiner

*Primary Examiner* — Michael P Ferguson
*Assistant Examiner* — Nahid Amiri
(74) *Attorney, Agent, or Firm* — Viksnins Harris & Padys PLLP

(57) ABSTRACT

Apparatus and methods for attaching and detaching a device to and from a DIN rail, the apparatus includes a housing carrier with a coupling assembly. The coupling assembly including one or more operator links, the one or more operator links rotatable relative to the housing carrier about a pivot, and the coupling assembly includes at least one DIN rail catch. The operator links have a first position in which the at least one DIN rail catch is in a first coupled position, and the operator links have a second position in which the at least one DIN rail catch is in a second uncoupled position. The operator links are operable to move the at least one DIN rail catch from the first coupled position to the second uncoupled position when the operator link is rotated about the pivot.

13 Claims, 7 Drawing Sheets

METHOD AND APPARATUS TO ATTACH DEVICE TO DIN RAIL

TECHNICAL FIELD

This disclosure relates to the field of DIN rails and housings attached thereto.

TECHNICAL BACKGROUND

Electronic device housings are often mounted to a DIN rail. In an example, a power supply is detachably mounted to a DIN rail in a manner which resists unintentionally loosening the housing from the DIN rail, yet permits easy removal for repair or replacement. The housing includes a mechanism for attaching the electronic device to the DIN rail. To reduce the inadvertent loosening of the housing from the DIN rail, a tool is required to remove the housing, which can make removal of the housing difficult and/or time consuming.

It would be advantageous if an improved device or method for attaching a device to and removing a device from a DIN rail could be developed that would allow one or more of the drawbacks discussed above and/or one or more other drawbacks to be entirely or at least partly overcome.

SUMMARY

In one or more embodiments, an apparatus for coupling with a DIN mounting rail, the apparatus includes a housing carrier having a recessed portion therein, the recessed portion of the housing carrier is configured to receive one or more components therein. The housing carrier includes a coupling assembly, and the coupling assembly has one or more operator links, and the one or more operator links are rotatable relative to the housing carrier about a pivot. The coupling assembly further includes at least one DIN rail catch and at least one pivot link coupled with the operator link near the pivot. The one or more operator links have a first position and a second position. In the first position, the at least one DIN rail catch is in a first coupled position. In the second position, the at least one DIN rail catch is in a second uncoupled position. The at least one pivot link is configured and sized to interact with at least a portion of the housing carrier when the one or more operator links are moved from the first position to the second position. The one or more operator links are operable to move the at least one DIN rail catch from the first coupled position to the second uncoupled position when the operator link is rotated about the pivot. In an embodiment, operator link end portions are squeezed with thumb and index finger of the operator, which causes the operator link to rotate about the pivot link.

In one more embodiments, a method of installing and/or removing an apparatus from a DIN mounting rail includes rotating at least one operator links of the apparatus, the apparatus including a housing carrier having a recessed portion therein, the recessed portion of the housing carrier configured to receive one or more components therein, the housing carrier including a coupling assembly, the coupling assembly including one or more operator links, the one or more operator links rotatable relative to the housing carrier about a pivot, the coupling assembly including at least one DIN rail catch, the coupling assembly further includes at least one pivot link coupled with the operator link near the pivot, the one or more operator links having a first position in which the at least one DIN rail catch is in a first coupled position, the operator links having a second position in which the at least one DIN rail catch is in a second uncoupled position, the at least one pivot link configured and sized to interact with at least a portion of the housing carrier when the one or more operator links are moved from the first position to the second position, the operator links operable to move the at least one DIN rail catch from the first coupled position to the second uncoupled position when the operator links are rotated about the pivot. The method further includes rotating the operator link includes rotating the operator link from the first position to the second position, rotating the operator link includes using cantilever action of the pivot arm relative to the housing carrier, and moving the DIN rail catch from the first coupled position to the second uncoupled position.

Other embodiments, aspects, features, objectives, and advantages of the present invention will be understood and appreciated upon a full reading of the detailed description and the claims that follow.

BRIEF DESCRIPTION OF THE DRAWINGS

Embodiments are disclosed with reference to the accompanying drawings and are for illustrative purposes only. The invention is not limited in its application to the details of construction or the arrangements of components illustrated in the drawings. The invention is capable of other embodiments or of being practiced or carried out in various other ways. Like reference numerals are used to indicate like components. In the drawings.

DETAILED DESCRIPTION

The following detailed description includes references to the accompanying drawings, which form a part of the detailed description. The drawings show, by way of illustration, specific embodiments in which the apparatus and methods may be practiced. These embodiments, which are also referred to herein as "examples," or "options" are described in enough detail to enable those skilled in the art to practice the present invention. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

A system includes an apparatus and a method for installing the apparatus to a DIN rail. The apparatus can be used to connect a variety of devices to the DIN rail. The system allows for the apparatus to be installed easily with a one-handed operation. The user can install or uninstall the apparatus without having to reach deeply into the equipment, reducing the risk of unintended shock or damage to other components.

FIGS. 1-7 illustrate a system including an apparatus 100 and a DIN rail 102. The apparatus 100 is used in conjunction with a DIN mounting rail, for example, to mount equipment and/or components with the DIN mounting rail. The apparatus includes a housing carrier 112 having a recessed portion 114 therein. The recessed portion 114 of the housing carrier is sized, shaped, and/or configured to receive one or more components therein. Examples of the components that are received in the carrier include, but are not limited to a power supply. The components can be set within the housing carrier 112 and/or further secured therein. The components can be removably secured on or within the housing carrier 112, or permanently secured on or within the housing carrier 112. In one or more embodiments, the housing carrier 112 has a central portion and two end portions, and the central portion and the end portions have an interference fit with each other.

Figure 1:
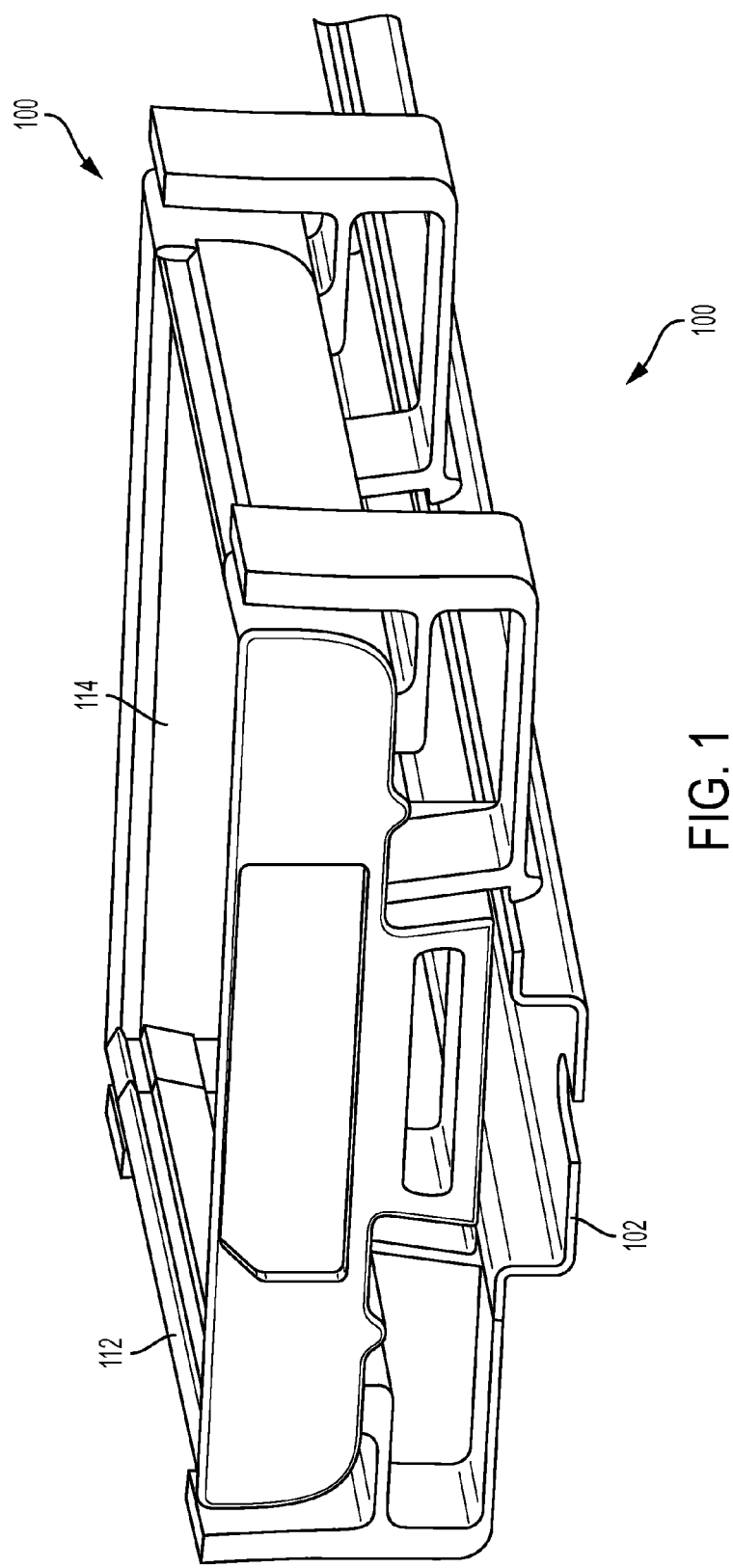
FIG. 1 is a first perspective view of an apparatus as constructed in accordance with one or more embodiments.
Figure 2:
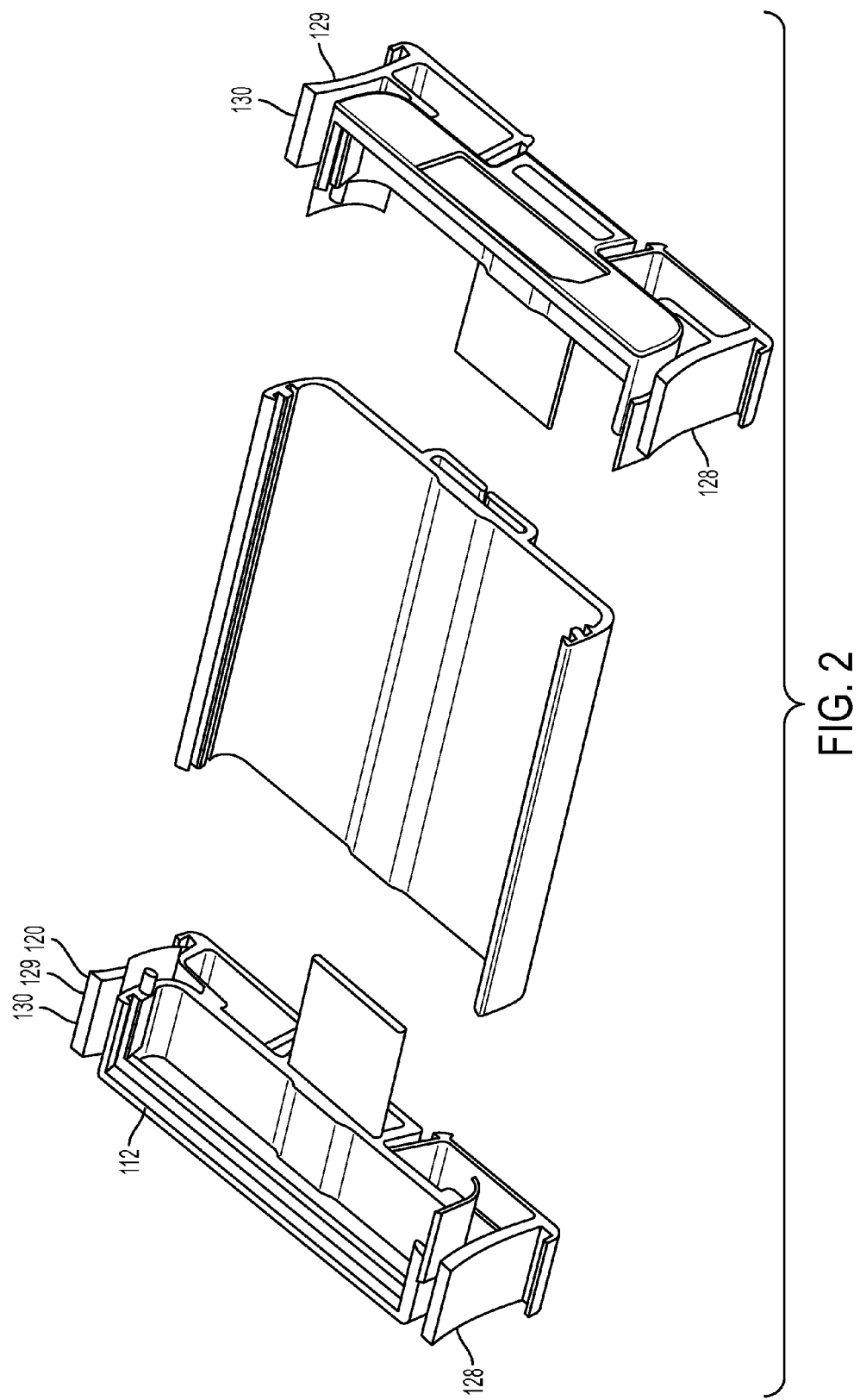
FIG. 2 is an exploded perspective view of an apparatus as constructed in accordance with one or more embodiments.
Figure 3:
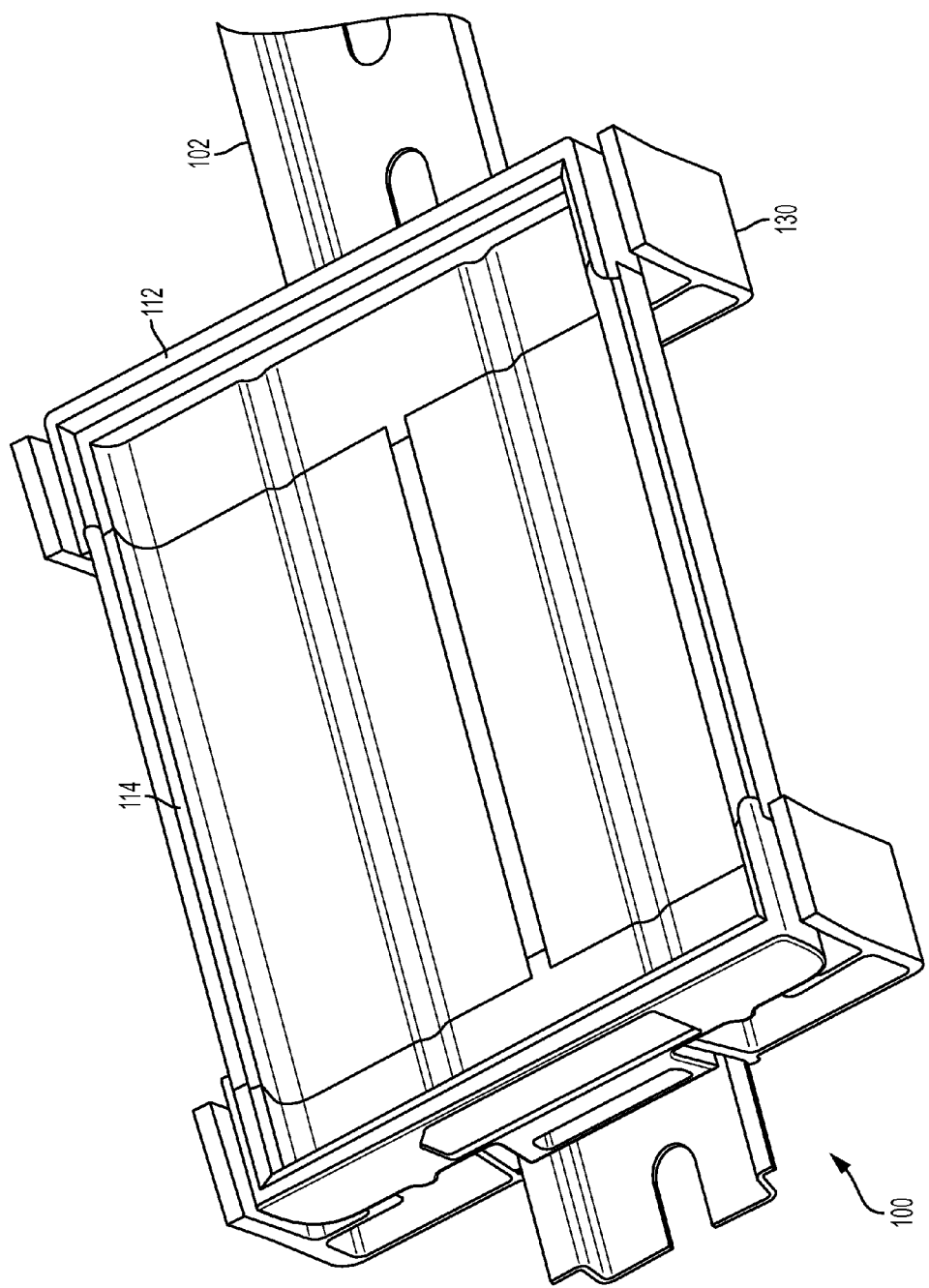
FIG. 3 is a second perspective view of an apparatus as constructed in accordance with one or more embodiments.

The housing carrier 112 includes a coupling assembly 120 that allows for the housing carrier 112 to be assembled to and/or removed from a DIN mounting rail. The coupling assembly 120 includes one or more operator links 130, as shown in FIGS. 1-5. In one or more embodiments, the one or more operator links 130 include a first operator link 128 and a second operator link 129 disposed along opposite sides of the housing carrier 112. In one or more embodiments, two or more sets of operator links 128, 129 are included, for example as shown in FIG. 2. The use of the opposite links 128, 129 with, for example, a user's thumb and index finger doubles the snap catch motion.

Figure 4:
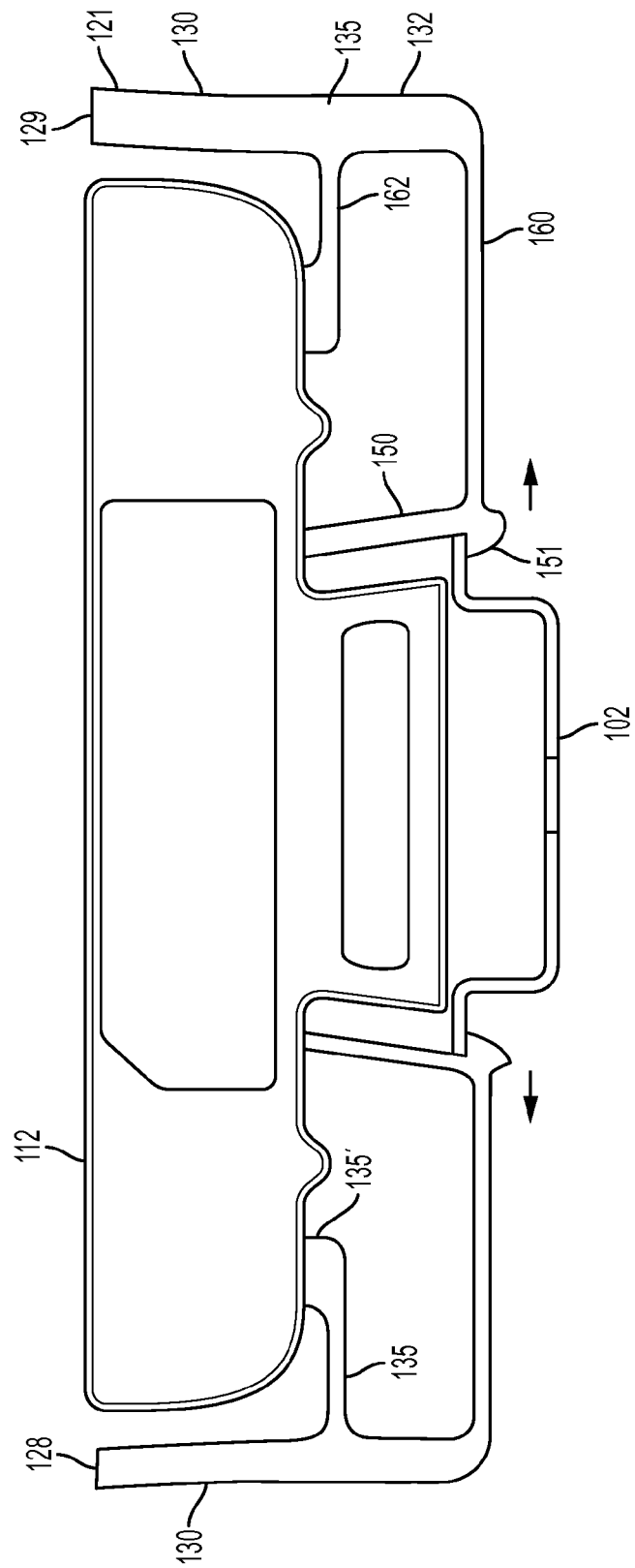
FIG. 4 is a side view of an apparatus in a coupled position (installed on DIN rail) as constructed in accordance with one or more embodiments.

Referring to FIG. 4, the operator links 130 extend from a first end 121 to a second end, where the first end 121 is grasped by a user during operation of the coupling assembly 120, for example, to remove the assembly 120 from the DIN rail 102, or to assemble the coupling assembly 120 thereto. In one or more embodiments, the operator links 130 are substantially parallel with an outer side portion of the housing when the assembly is coupled to the DIN rail. In one or more embodiments, the first end 121 extends to about a top portion of the housing carrier so that a user can easily remove the housing carrier 112 from the DIN rail without having to reach deeply into electronic equipment. In one or more embodiments, the operator links 130 have a length in the range of about 0.4-0.7 inches from the end 121 to the pivot 135. In one or more embodiments, the operator link 130 has a first length from the end 121 to the pivot 135, and a second length from the pivot 135 to the second end. In one or more embodiments, a ratio of the first length to the second length is 0.7-1.3, allowing for ease of use in combination with ease of reach for the user.

During use of the apparatus, the operator links 130, such as the first and second operator links 128, 129 rotate relative to the housing carrier 112 about the pivot 135. In one or more embodiments, the pivot 135, for example a flexible pivot 135, is a pivot link 162 that extends from the operator links 130. In one or more embodiments, a ratio of the pivot link 162 length to the operator link 130 length is about 0.25-0.8. The pivot link 162, in one or more embodiments, is hingedly coupled with a portion of the operator link 130. In one or more embodiments, the pivot 135 includes a portion 135' which interacts with a portion of the housing carrier 112, for example, but not limited to, a bottom portion of the housing carrier. In one or more embodiments, the pivot 135, such as the pivot link 162, acts as a cantilever off of the housing carrier 112, such as off of a bottom portion or surface of the housing carrier 112.

The coupling assembly 120 further includes at least one DIN rail catch 151. The DIN rail catch 151 is a coupling that is shaped, sized, and/or configured to engage with a portion of the DIN rail. For example, the DIN rail catch 151 can include one or more of a hook, C-shape structure, L-shape structure, projection, recess which couples with corresponding structure of the DIN rail 102.

In one or more embodiments, the coupling assembly 120 further includes a stabilizer link 150. The stabilizer link is configured and sized to support at least a portion of the housing carrier when the catch is moved from the first coupled position to the second uncoupled position. In an option, the catch is disposed at a first portion 149 of the stabilizer link 150. In one or more embodiments, a second link 132 is coupled with the operator link 130 at the pivot 135, and a bottom link 160 is coupled with the second link 132. In one or more embodiments, the operator link 130, second link 132, and bottom link 160 collectively have an L shape. In one or more embodiments, the second link 132 forms a portion of the operator link 130, and is integral therewith. In one or more embodiments, the bottom link In one or more embodiments, the bottom link connects the operator link 160 to the stabilizer link, and the bottom link transfers linear motion from an end of the operator link to the stabilizer link, allowing for engagement and disengagement with the DIN rail.

Figure 5:
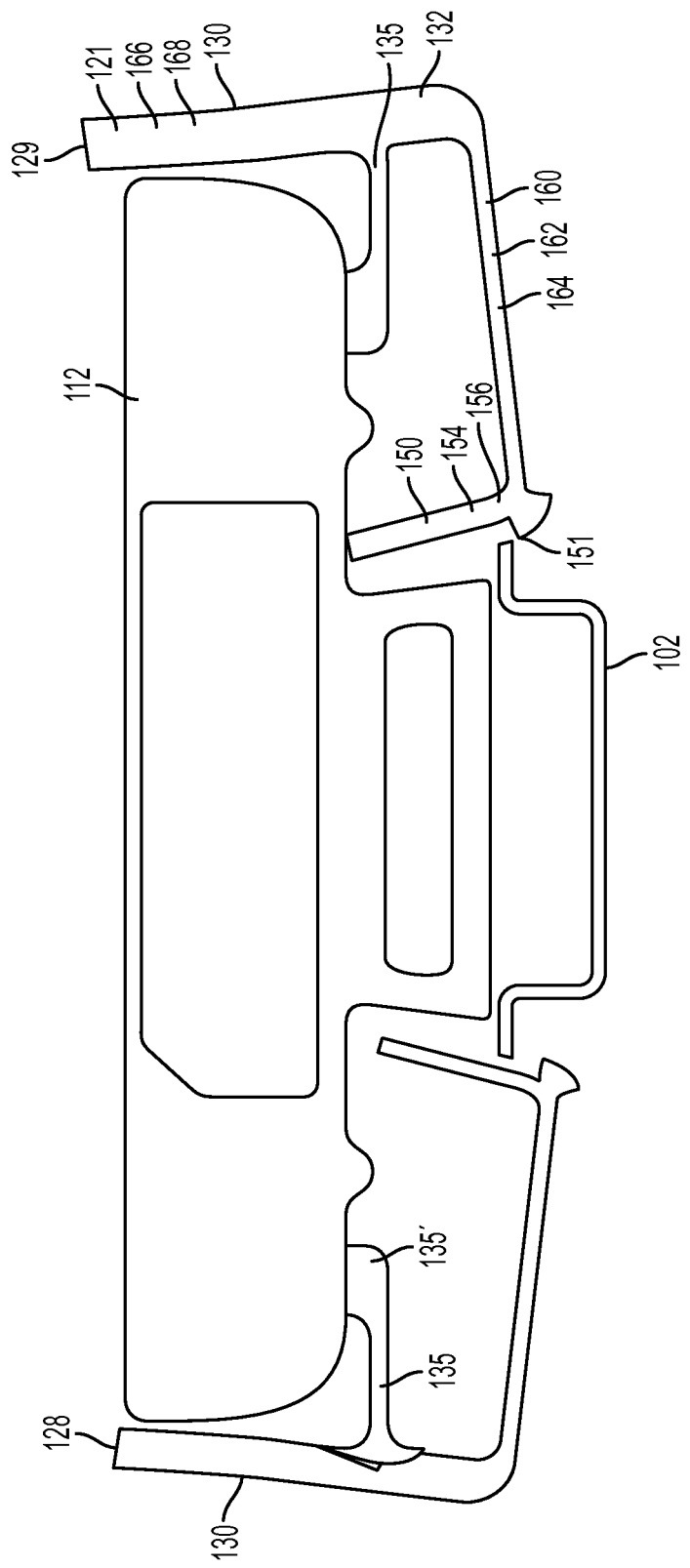
FIG. 5 is a perspective view of a portion of an apparatus in an uncoupled position (removed from DIN rail) as constructed in accordance with one or more embodiments.
Figure 6:
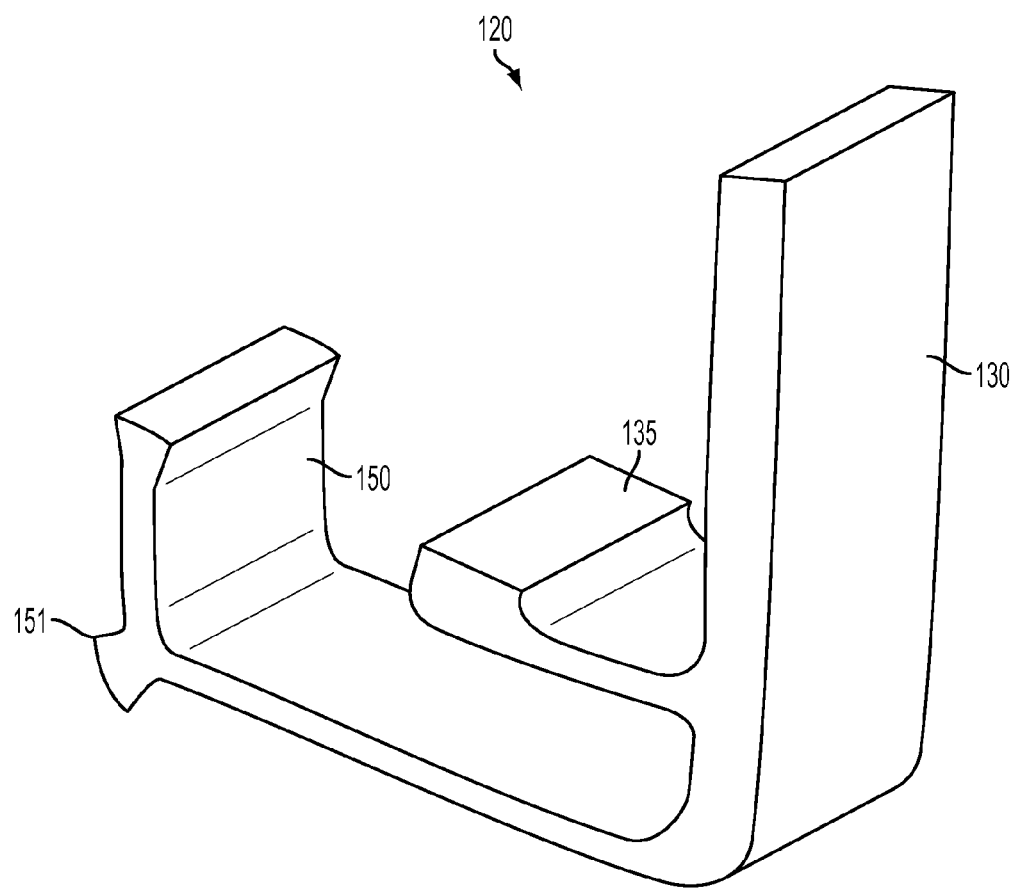
FIG. 6 is a perspective view of a portion of an apparatus in an uncoupled position as constructed in accordance with one or more embodiments.
Figure 7:
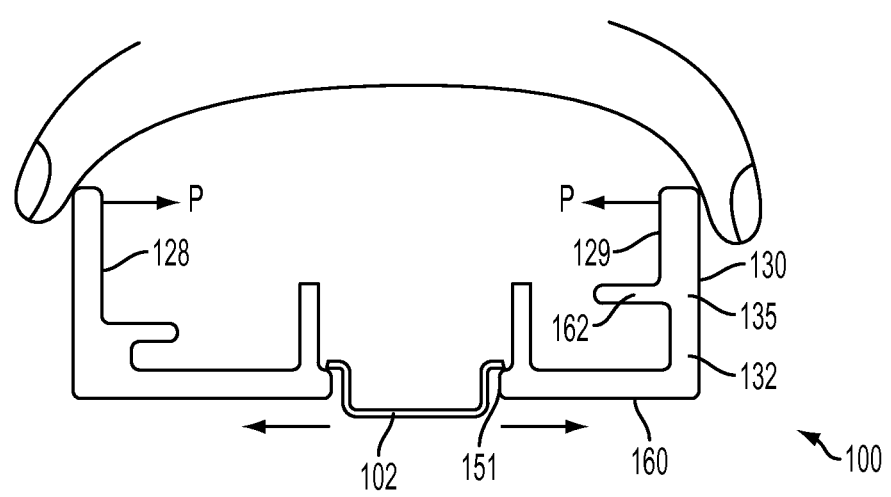
FIG. 7 is a cross-sectional side view of a coupling assembly as constructed in accordance with one or more embodiments.

In at least one embodiment, the one or more operator links 130 have a first position in which the at least one DIN rail catch 151 is in a first coupled position, as shown in FIG. 4. The operator links 130 further have a second position in which the at least one DIN rail catch 151 is in a second uncoupled position, as shown in FIG. 5, where the DIN rail catch 151 is uncoupled from the DIN rail 102, and the housing carrier 112 can be removed from the DIN rail 102. In one or more embodiments, the at least one pivot 135, such as the pivot link 162, is configured and sized to interact with at least a portion of the housing carrier when the one or more operator links are moved from the first position to the second position. In one or more embodiments, the operator links move a first distance when moved from the first position to the second position, at least one DIN rail catch moves a second distance from the first coupled position to the second uncoupled position, a ratio of the first distance to the second distance is in the range of 0.1-1. The size of the pivot, such as the pivot link 162, allows for the coupling assembly 120 to be effectively assembled and/or removed from the DIN rail 102.

During use, the one or more operator links operable to move the at least one DIN rail catch from the first coupled position to the second uncoupled position when the operator link is rotated about the pivot, such as the pivot link 162. In one or more embodiments, the at least one pivot link 162 includes a first pivot link associated with the first operator link and a second pivot link coupled with the second operator link, the at least one DIN rail catch includes a first DIN rail catch and a second DIN rail catch, the first DIN rail catch and the second DIN rail catch are movable from the first coupled position to the second uncoupled position via movement of the first operator link and the second operator link, respectively. In one or more embodiments, the first pivot link and the second pivot link are on opposite sides of the housing carrier. In one or more embodiments, the first DIN rail catch and the second DIN rail catch are disposed on opposite sides of the carrier, for example on opposite sides of the DIN rail 102, as shown in FIG. 4.

In one or more embodiments, a method includes a method of installing and/or removing an apparatus from a DIN mounting rail. The method includes rotating at least one operator links of the apparatus, for example by depressing or squeezing the operator link end, the apparatus including a housing carrier having a recessed portion therein, the recessed portion of the housing carrier configured to receive one or more components therein, the housing carrier including a coupling assembly, the coupling assembly including one or more operator links, the one or more operator links rotatable relative to the housing carrier about a pivot, the coupling assembly including at least one DIN rail catch, the coupling assembly further includes at least one pivot link 162 coupled with the operator link near the pivot, the one or more operator links having a first position in which the at least one DIN rail catch is in a first coupled position, the operator links having a second position in which the at least one DIN rail catch is in a second uncoupled position, the at least one pivot link 162 configured and sized to interact with at least a portion of the housing carrier when the one or more operator links are moved from the first position to the second position, the operator links operable to move the at least one DIN rail catch from the first coupled position to the second uncoupled position when the operator links are rotated about the pivot. The method further includes rotating the operator link includes rotating the operator link from the first position to the second position, rotating the operator link includes using cantilever action of the pivot arm relative to the housing carrier, and moving the DIN rail catch from the first coupled position to the second uncoupled position. In one or more embodiments, rotating the operator link includes squeezing opposing operator links towards each other and moving the DIN rail catch from the first coupled position to the second uncoupled position. In one or more embodiments, rotating the operator link includes moving a first and second operator link, and further moving a distal end of one of the operator links in a first direction. As the distal end of the operator link moves in a first direction, the catch associated with the operator link moves in a second direction, and the first direction is opposite of the second direction. This occurs, for example, as the operator link pivots about the pivot or pivot link 162.

In one or more embodiments, at least one pivot link 162 includes a first pivot link associated with the first operator link and a second pivot link is coupled with the second operator link. The DIN rail catch includes a first DIN rail catch and a second DIN rail catch, and moving the DIN rail catch from the first coupled position to the second uncoupled position includes moving the first DIN rail catch and the second DIN rail catch via movement of the first operator link and the second operator link, respectively.

The housing carrier, in one or more embodiments, can be assembled with the coupling assembly. For example, the coupling assembly and the housing carrier can be coupled together using separate mechanical fasteners. In one or more embodiments, the coupling assembly and the housing carrier can be assembled together with an interference fit. For example, the coupling assembly can have a projection that fits with a recess of the housing carrier, or vice versa. In another embodiment, there can be a combination of projections and recesses on each component. In yet another embodiment, the coupling assembly and the housing carrier can be assembled together using one or more of bonding or welding techniques.

Notwithstanding the above examples, the system and/or apparatus and related methods are intended to encompass numerous other embodiments and/or applications, and/or to satisfy a variety of other performance levels or criteria in addition to or instead of the above examples. It is specifically intended that the present invention not be limited to the embodiments and illustrations contained herein, but include modified forms of those embodiments including portions of the embodiments and combinations of elements of different embodiments as come within the scope of the following claims.

We claim:

1. An apparatus for coupling with a DIN mounting rail, the apparatus comprising:
   a housing carrier having a recessed portion therein, the recessed portion of the housing carrier configured to receive one or more components therein;
   the housing carrier received by an inner channel of a coupling assembly;
   the coupling assembly including at least one pair of opposing operator links disposed on opposing sides of the inner channel, the pair of operator links each rotatable relative to the housing carrier about a respective pivot, the coupling assembly including a DIN rail catch disposed at a distal end of each operator link;
   the coupling assembly includes at least one pivot link coupled with each of the operator links near each respective pivot;
   the pair of operator links having a first position in which each DIN rail catch is in a first coupled position in engagement with the DIN mounting rail, the pair of operator links having a second position in which each DIN rail catch is in a second uncoupled position disengaged with the DIN mounting rail;
   each respective at least one pivot link configured and sized to interact with at least a portion of the housing carrier when the pair of operator links are moved from the first position to the second position; and
   the pair of operator links operable to move each respective DIN rail catch from the first coupled position to the second uncoupled position when the operator links are rotated about the pivots and proximal ends of the pair of operator links are flexed toward each other.

2. The apparatus as recited in claim 1, further comprising a stabilizer link, the stabilizer link configured and sized to support at least a portion of the housing carrier when the catch is moved from the first coupled position to the second uncoupled position, the catch disposed at a first portion of the stabilizer link.

3. The apparatus as recited in claim 1, wherein the two or more operator links are substantially parallel with a side portion of the housing carrier.

4. The apparatus as recited in claim 1, wherein the two or more operator links extend from a first end to a second end, where the first end extends to about a top portion of the housing carrier.

5. The apparatus as recited in claim 1, wherein the operator links have a first length from a first end to the pivot, and a second length from the pivot to the second end, and a ratio of the first length to the second length is 0.7-1.3.

6. The apparatus as recited in claim 1, wherein the housing carrier has a central portion and two end portions, and the central portion and the end portions have an interference fit with each other.

7. The apparatus as recited in claim 1, further comprising a second link coupled with each operator link at the pivot, a bottom link coupled with the second link, the operator link, second link, and bottom link collectively have a general L-shape.

8. The apparatus as recited in claim 1, wherein the two or more operator links include a first operator link and a second operator link disposed along opposite sides of the housing carrier.

9. The apparatus as recited in claim 8, wherein the at least one pivot link includes a first pivot link associated with the first operator link and a second pivot link coupled with the second operator link, the at least one DIN rail catch includes a first DIN rail catch and a second DIN rail catch, the first DIN rail catch and the second DIN rail catch are movable from the first coupled position to the second uncoupled position via movement of the first operator link and the second operator link, respectively.

10. The apparatus as recited in claim 1, wherein the operator links move a first distance when moved from the first position to the second position, at least one DIN rail catch moves a second distance from the first coupled position to the second uncoupled position, a ratio of the first distance to the second distance is in the range of 0.1-1.

11. An apparatus for coupling with a DIN mounting rail, the apparatus comprising:
    a housing carrier having a recessed portion therein, the recessed portion of the housing carrier configured to receive one or more components therein;
    the housing carrier received by an inner channel of a coupling assembly;
    the coupling assembly including at least one pair of opposing operator links disposed on opposing sides of the inner channel, the pair of operator links each includes a first operator link and a second operator link disposed along opposite sides of the housing carrier, the pair of operator links each rotatable relative to the housing carrier about a respective pivot, the coupling assembly including a DIN rail catch associated and disposed at a distal end of each operator link;
    the coupling assembly further includes at least one pivot link coupled with each operator link near the pivot;
    the pair of operator links having a first position in which each DIN rail catch is in a first coupled position in engagement with the DIN mounting rail, the pair of operator links having a second position in which the each DIN rail catch is in a second uncoupled position disengaged with the DIN mounting rail;
    each respective at least one pivot link configured and sized to interact with at least a portion of the housing carrier when the pair of operator links are moved from the first position to the second position;
    the pair of operator links operable to move each respective DIN rail catch from the first coupled position to the second uncoupled position when the operator link is rotated about the pivots and proximal ends of the pair of operator links are and flexed toward each other; and
    the at least one pivot link includes a first pivot link associated with the first operator link and a second pivot link coupled with the second operator link, the at least one DIN rail catch includes a first DIN rail catch and a second DIN rail catch, the first DIN rail catch and the second DIN rail catch are movable from the first coupled position to the second uncoupled position via movement of the first operator link and the second operator link, respectively.

12. The apparatus as recited in claim 11, wherein the operator links move a first distance when moved from the first position to the second position, at least one DIN rail catch moves a second distance from the first coupled position to the second uncoupled position, a ratio of the first distance to the second distance is in the range of 0.1-1.

13. The apparatus as recited in claim 11, further comprising a stabilizer link, the stabilizer link configured and sized to support at least a portion of the housing carrier when the catch is moved from the first coupled position to the second uncoupled position, the catch disposed at a first portion of the stabilizer link.

* * * * *